US010627509B2

(12) United States Patent
Rector et al.

(10) Patent No.: US 10,627,509 B2
(45) Date of Patent: Apr. 21, 2020

(54) CALL-SIGN IMPLEMENTATION OPTIMIZED FOR FMCW HF OCEANOGRAPHIC RADARS

(71) Applicant: CODAR Ocean Sensors, Ltd., Mountain View, CA (US)

(72) Inventors: William C. Rector, San Jose, CA (US); Donald E. Barrick, Emerald Hills, CA (US)

(73) Assignee: CODAR Ocean Sensors, Ltd., Mountain View, CA (US)

( * ) Notice: Subject to any disclaimer, the term of this patent is extended or adjusted under 35 U.S.C. 154(b) by 323 days.

(21) Appl. No.: 15/458,850

(22) Filed: Mar. 14, 2017

(65) Prior Publication Data

US 2018/0074192 A1   Mar. 15, 2018

Related U.S. Application Data

(60) Provisional application No. 62/395,221, filed on Sep. 15, 2016.

(51) Int. Cl.
| | | |
|---|---|---|
| G01S 13/95 | (2006.01) | |
| G01S 13/34 | (2006.01) | |
| G01S 7/00 | (2006.01) | |
| G01S 13/58 | (2006.01) | |
| G01S 7/35 | (2006.01) | |
| G01S 13/00 | (2006.01) | |
| G01S 13/87 | (2006.01) | |

(52) U.S. Cl.
CPC ............ *G01S 13/95* (2013.01); *G01S 7/003* (2013.01); *G01S 7/006* (2013.01); *G01S 7/35* (2013.01); *G01S 13/003* (2013.01); *G01S 13/34* (2013.01); *G01S 13/58* (2013.01); *G01S 13/87* (2013.01); *G01S 13/951* (2013.01); *Y02A 90/18* (2018.01)

(58) Field of Classification Search
CPC ........ G01S 13/95; G01S 13/003; G01S 13/34; G01S 13/58; G01S 13/87; G01S 13/951; G01S 7/003; G01S 7/006; G01S 7/35; Y02A 90/18; G01G 13/95; G01G 13/003; G01G 13/34; G01G 13/58; G01G 13/87; G01G 13/951
USPC ...................................................... 342/26 R
See application file for complete search history.

(56) References Cited

U.S. PATENT DOCUMENTS

| | | | |
|---|---|---|---|
| 5,361,072 A | 11/1994 | Barrick et al. | |
| 5,900,834 A | 5/1999 | Kubinec | |
| 6,222,480 B1 * | 4/2001 | Kuntman | G01S 13/767 342/30 |
| 6,707,378 B2 * | 3/2004 | MacNeille | G08G 1/161 340/435 |
| 6,774,837 B2 | 8/2004 | Barrick et al. | |
| 6,856,276 B2 * | 2/2005 | Barrick | G01S 7/02 342/59 |
| 7,486,221 B2 * | 2/2009 | Meyers | G01S 7/006 342/60 |

(Continued)

*Primary Examiner* — Vladimir Magloire
*Assistant Examiner* — Michael W Justice
(74) *Attorney, Agent, or Firm* — Weaver Austin Villeneuve & Sampson LLP

(57) ABSTRACT

Techniques are described for implementation of the requirement of Resolution 612 of International Telecommunications Union that oceanographic radar systems broadcast a Morse-coded call sign for station identification at least once every 20 minutes.

28 Claims, 5 Drawing Sheets

(56) References Cited

U.S. PATENT DOCUMENTS

| | | | | |
|---|---|---|---|---|
| 2007/0159376 A1* | 7/2007 | Abatzoglou | ........... | G01S 13/904 |
| | | | | 342/25 R |
| 2013/0208829 A1* | 8/2013 | Cordova Val | ........... | H04L 27/04 |
| | | | | 375/300 |
| 2015/0319700 A1* | 11/2015 | Oteri | ........... | H04W 52/28 |
| | | | | 455/127.1 |
| 2016/0353238 A1* | 12/2016 | Gherardi | ........... | H04W 4/021 |
| 2017/0187721 A1* | 6/2017 | Raynor | ........... | G01S 17/10 |

* cited by examiner

CALL-SIGN IMPLEMENTATION OPTIMIZED FOR FMCW HF OCEANOGRAPHIC RADARS

RELATED APPLICATION DATA

The present application is a non-provisional of and claims priority under 35 U.S.C. 119(e) to U.S. Provisional Patent Application No. 62/395,221 for Call-Sign Implementation Optimized For FMCW HF Oceanographic Radars filed on Sep. 15, 2016, the entire disclosure of which is incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

At the end of 2012, the ITU (International Telecommunications Union, a branch of the United Nations) issued Resolution 612, which allotted designated secondary radio spectral slots to coastal oceanographic radars (3-50 MHz). These radars are used in worldwide, real-time operational networks to map ocean surface currents primarily, but also to monitor sea state (wave heights); warn of approaching tsunamis; and detect/track vessels. Depending on the frequency, their signals are able to propagate beyond the visible and microwave horizon due to the conducting sea water. There are about 500 such radar systems operating today across the globe.

Before Resolution 612, these radars were licensed as "experimental", under the ITU R4.4 designation. As such, permission to operate carried no priority, and a complaint of interference to any licensed user would result in cessation of broadcasting. The new resolution, approved by delegates after a 5-year WRC12 (World Radio Conference) allotted a few but narrow secondary licensing bands for the radars' operations, ending their "experimental" era.

The narrow spectral slots approved under Resolution 612 require that many radars share the same channel. This presents the challenge of mutual interference if they must operate at the same time and are not too distant from each other. There are many reasons why simultaneous operation (rather than "time multiplexing", i.e., taking turns on-off) is needed, primarily for emergency applications. This includes tsunami warning, search and rescue, oil-spill management, and vessel tracking. This challenge has been solved by an invention germane to radars using frequency-modulated continuous wave (FMCW) modulation described in U.S. Pat. No. 6,856,276, the entire disclosure of which is incorporated herein by reference. FMCW modulation is used by nearly all HF oceanographic radars worldwide. It employs a slow linear sweep of frequency over a period up to one second, then continuous repeats as described in U.S. Pat. No. 5,361,072, the entire disclosure of which is incorporated herein by reference. The sweep bandwidth determines the range resolution, e.g., 50 kHz gives 3 km; a typical scenario. The invention described in U.S. Pat. No. 6,856,276, the entire disclosure of which is incorporated herein by reference, overlaps the signals from many radars but offsets their sweep start times, thereby ensuring that the information spaces of each radar do not overlap so they do not mutually interfere. This requires precise timing stability that depends on GPS signals to synchronize.

Part of the condition for authorized use of these ITU-authorized bands is the requirement that each radar must transmit a Morse-coded call sign issued by its national authority (e.g., in the U.S., this is the FCC—Federal Communications Commission). The unique call sign identifies the transmitter. The worldwide process of implementing this has begun.

As of mid-2016, no oceanographic radars operating in the MF-UHF spectral regions have begun broadcasting call signs. In response to the ITU Resolution 612, this is expected to commence in the near future, with each country demanding compliance at differing times. No guidance is given in the ITU resolution or subsequent rulings on how to achieve an acceptable call-sign format, nor must the methodologies be identical. The only requirement is that the call sign for each radar must be broadcast at least every 20 minutes; that the normal universal 6-character string (alphanumeric) be broadcast in International Morse Code and at a rate of about 15 words per minute. The software and firmware requirements for call-sign broadcast are specific to a given brand. Hence it will be up to the commercial manufacturer to implement this for their own FMCW radar. Since over 40 countries would be users of coastal oceanographic radars, and there are fewer than four vendors, they would be required to manufacture or modify their brand radars—upon request by the owners/operators—in different countries.

Low-frequency backscatter and bistatic radar systems, operating in the MF, HF, VHF, and UHF bands, are widely used for mapping and monitoring water surface targets such as currents, vessels, and waves on the ocean, or on rivers. Nearly 150 such HF/VHF radars presently operate along the U.S. coasts as part of the U.S. Integrated Ocean Observing System (IOOS) program of the National Oceanic and Atmospheric Administration (NOAA), and such systems output their data to public U.S. websites (hfradar.ndbc.noaa.gov). Several other countries now have similar radar networks on their coasts. A total of at least 500 of these oceanographic radars are deployed and operate worldwide.

At least two backscatter radars are normally needed to map currents, because each radar measures only a scalar radial vector component, and a view from two directions is needed to construct a total 2D vector for a map. These scalar velocities are based on the Doppler principle, after separating the known Bragg-wave velocity from the unknown current velocity. In the case of a vessel target, its position and radial velocity are measured by a single radar, but a view from two radars offers the advantage of increased detection and tracking robustness.

Range or distance to the target or scattering cell is obtained from the time delay between transmit and received echoes, as is the case in all radars. After range processing, the complex (real and imaginary) echo time series for each range cell is Fourier transformed to obtain Doppler spectra and/or cross spectra among several receive antennas or elements. The velocity of the echoing target (current or vessel), as well as its bearing, is extracted from the signals at this point. One suitable and widely used bearing determination algorithm is Multiple Signal Classification (MUSIC), a direction-finding (DF) technique described in U.S. Pat. No. 5,900,834, the entire disclosure of which is incorporated herein by reference. This backscatter radar makes its measurements in a polar coordinate system in which radial current velocity at each point in the coverage area is measured by each radar on the polar grid.

In networks of coastal radars, greater data coverage and robustness for a given number of backscatter radars can be obtained by synchronizing these systems to a stable timing base and operating them multi-statically. The methodology for this is discussed in U.S. Pat. No. 6,774,837, the entire disclosure of which is incorporated herein by reference. The transmitter of one backscatter radar illuminates the sea surface, for example, where it is scattered by the waves or vessel target, and returns as echo to a different backscatter receiver. While thusly operating bistatically, each radar receiver continues simultaneously receiving echoes in its normal backscatter mode. A convenient and inexpensive multi-static synchronization method in common use employs the stable time base of GPS satellite signals; see U.S. Pat. No. 6,856,276 incorporated herein by reference above.

SUMMARY

Systems, methods, apparatus, and computer program products are provided for implementing call-sign functionality in oceanographic radar systems.

According to a first class of implementations, a coastal radar system is provided having a network of frequency-modulated continuous wave (FMCW) radar systems. Each FMCW radar system includes a radio frequency (RF) transmitter and computing resources configured to control operation of the RF transmitter. The computing resources for each of the FMCW radar systems is configured to control the RF transmitter to periodically transmit first RF energy in a radar data capture mode and to periodically transmit second RF energy in a call sign mode. The second RF energy is modulated using Morse code to represent a call sign for the corresponding FMCW radar system. The call sign modes for the respective FMCW radar systems occur at different times and do not interfere with the radar data capture modes of others of the FMCW radar systems.

According to a particular implementation of the first class of implementations, for each of the FMCW radar systems, the first RF energy occupies a first frequency band and the second RF energy occupies a second frequency band. The first frequency band is substantially the same as the second frequency band. According to a more specific implementation, for each of the FMCW radar systems, the first RF energy and the second RF energy are characterized by substantially the same intensity.

According to a particular implementation of the first class of implementations, each of the FMCW radar systems includes an RF receiver. The computing resources for each of the FMCW radar systems are configured to disable the RF receiver while the RF transmitter is in the call sign mode, and to interpolate radar data received by the RF receiver during successive periods of the radar data capture mode to mitigate digital processing artifacts associated with the RF receiver being disabled during the call sign mode. According to a more specific implementation, for each of the FMCW radar systems, the radar data capture mode is characterized by a time-series Doppler-processing input cycle, and the call sign mode occupies a gap in the time-series Doppler-processing input cycle. For each of the FMCW radar systems, the computing resources are configured to interpolate the radar data received by the RF receiver during the successive periods of the radar data capture mode by averaging the radar data over a remainder of the time-series Doppler-processing input cycle. According to a still more specific implementation, for each of the FMCW radar systems, the time-series Doppler processing cycle includes a plurality of radar sweep periods, and the gap corresponding to the call sign mode begins at an end of one of the radar sweep periods.

According to a second class of implementations, a frequency-modulated continuous wave (FMCW) radar system is provided that includes a radio frequency (RF) transmitter and computing resources configured to control operation of the RF transmitter. The computing resources are configured to control the RF transmitter to periodically transmit first RF energy in a first frequency band in a radar data capture mode, and to periodically transmit second RF energy in a second frequency band in a call sign mode. The second RF energy is modulated using Morse code to represent a call sign for the FMCW radar system. The first frequency band is substantially the same as the second frequency band.

According to a particular implementation of the second class of implementations, the first RF energy and the second RF energy are characterized by substantially the same intensity.

According to a particular implementation of the second class of implementations, the FMCW radar system includes an RF receiver. The computing resources are configured to disable the RF receiver while the RF transmitter is in the call sign mode, and to interpolate radar data received by the RF receiver during successive periods of the radar data capture mode to mitigate digital processing artifacts associated with the RF receiver being disabled during the call sign mode. According to a more specific implementation, the radar data capture mode is characterized by a time-series Doppler-processing input cycle, and the call sign mode occupies a gap in the time-series Doppler-processing input cycle. The computing resources are configured to interpolate the radar data received by the RF receiver during the successive periods of the radar data capture mode by averaging the radar data over a remainder of the time-series Doppler-processing input cycle. According to a still more specific implementation, the time-series Doppler processing cycle includes a plurality of radar sweep periods, and the gap corresponding to the call sign mode begins at an end of one of the radar sweep periods.

According to a third class of implementations, a frequency-modulated continuous wave (FMCW) radar system is provided that includes a radio frequency (RF) transmitter, an RF receiver, and computing resources configured to control operation of the RF transmitter and the RF receiver. The computing resources are configured to control the RF transmitter to periodically transmit first RF energy in a radar data capture mode and to periodically transmit second RF energy in a call sign mode. The second RF energy is modulated using Morse code to represent a call sign for the FMCW radar system. The computing resources are also configured to disable the RF receiver while the RF transmitter is in the call sign mode, and to interpolate radar data received by the RF receiver during successive periods of the radar data capture mode to mitigate digital processing artifacts due to the RF receiver being disabled during the call sign mode.

According to a particular implementation of the third class of implementations, the radar data capture mode is characterized by a time-series Doppler-processing input cycle, and the call sign mode occupies a gap in the time-series Doppler-processing input cycle. The computing resources are configured to interpolate the radar data received by the RF receiver during the successive periods of the radar data capture mode by averaging the radar data over a remainder of the time-series Doppler-processing input cycle. According to a more specific implementation, the time-series Doppler processing cycle includes a plurality of radar sweep periods, and the gap corresponding to the call sign mode begins at an end of one of the radar sweep periods.

According to a fourth class of implementations, a coastal radar system is provided including a network of frequency-modulated continuous wave (FMCW) radar systems. Each FMCW radar system includes a radio frequency (RF) transmitter and computing resources configured to control operation of the RF transmitter. The computing resources for each of the FMCW radar systems are configured to control the RF transmitter to periodically transmit first RF energy in a radar data capture mode and to periodically transmit second RF energy in a call sign mode. The second RF energy is modulated using Morse code to represent a call sign for the corresponding FMCW radar system. For each of the FMCW radar systems, the first RF energy occupies a first frequency band and the second RF energy occupies a second frequency band. The first frequency band is substantially the same as the second frequency band. For each of the FMCW radar systems, the first RF energy and the second RF energy are characterized by substantially the same intensity. The call sign modes for the respective FMCW radar systems occur at different times and do not interfere with the radar data capture modes of others of the FMCW radar systems.

According to a particular implementation of the fourth class of implementations, each of the FMCW radar systems includes an RF receiver. The computing resources for each of the FMCW radar systems are configured to disable the RF receiver while the RF transmitter is in the call sign mode, and to interpolate radar data received by the RF receiver during successive periods of the radar data capture mode to mitigate digital processing artifacts associated with the RF receiver being disabled during the call sign mode. According to a more specific implementation, for each of the FMCW radar systems, the radar data capture mode is characterized by a time-series Doppler-processing input cycle, and the call sign mode occupies a gap in the time-series Doppler-processing input cycle. For each of the FMCW radar systems, the computing resources are configured to interpolate the radar data received by the RF receiver during the successive periods of the radar data capture mode by averaging the radar data over a remainder of the time-series Doppler-processing input cycle. According to a still more specific implementation, for each of the FMCW radar systems, the time-series Doppler processing cycle includes a plurality of radar sweep periods, and the gap corresponding to the call sign mode begins at an end of one of the radar sweep periods.

A further understanding of the nature and advantages of various implementations may be realized by reference to the remaining portions of the specification and the drawings.

BRIEF DESCRIPTION OF THE DRAWINGS

FIG. 4a shows the time series of signals during a normal processing interval (e.g., 256 seconds), lower strip, as the horizontal axis, with range as the vertical axis and brightness intensity as signal strength. The upper strip is the corresponding Doppler spectrum of the lower strip, with horizontal axis being Doppler frequency. FIG. 4b is similar to FIG. 4a, except the call-sign gap has curative interpolation applied to get rid of the masking sidelobes of FIG. 4a produced by the abrupt gap turn on/off.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

This disclosure describes various techniques for implementing call-sign functionality in oceanographic radar systems in ways that meet the requirements of ITU Resolution 612.

Figure 1:
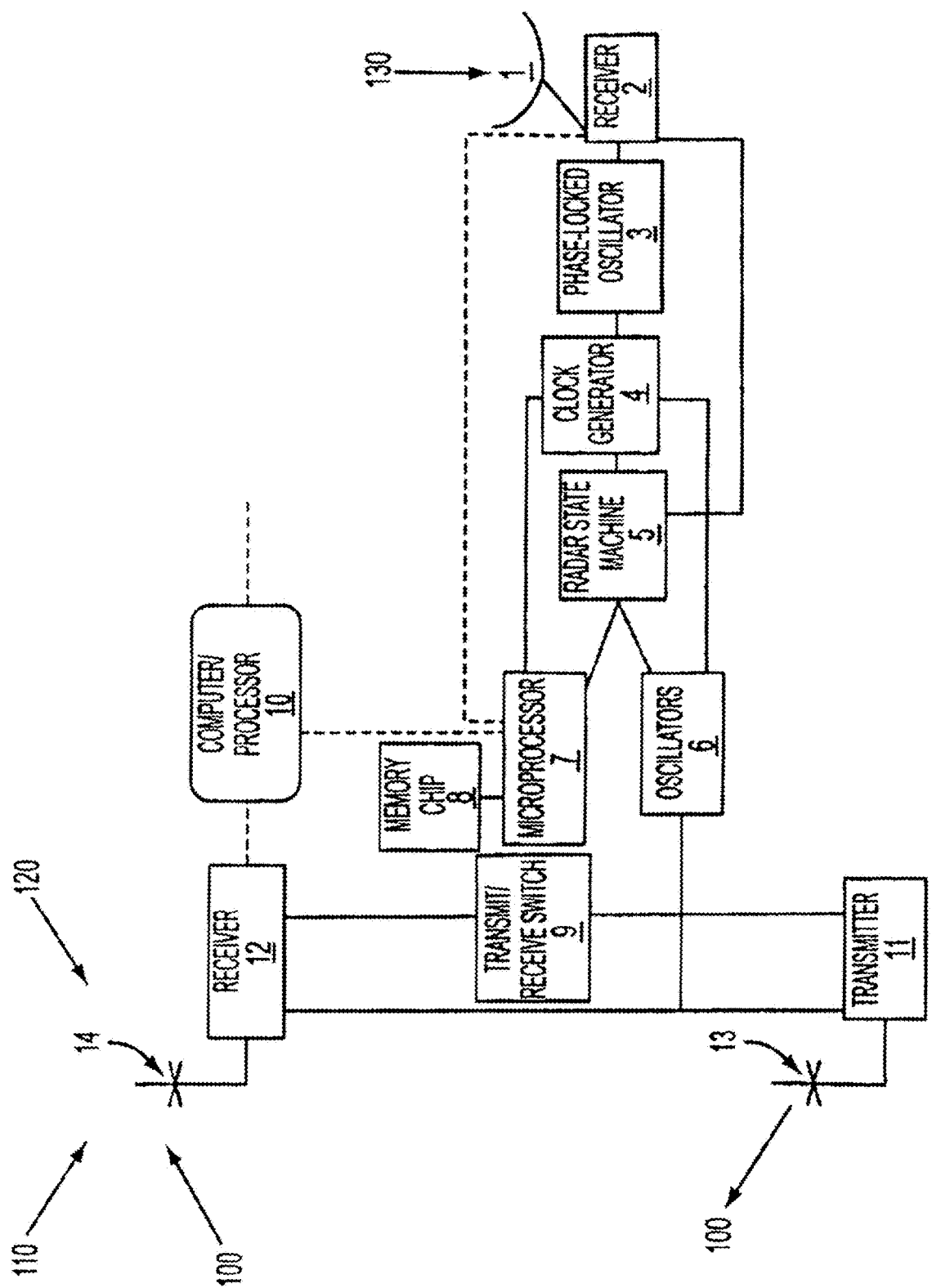
FIG. 1 is a simplified diagram of a radar site configured according to specific implementations.

FIG. 1 shows a simplified diagram of one instance of a coastal FMCW HF radar site configured, for example, map surface currents, monitor sea state, and/or detect tsunamis. Only one of the multiple instances typically operating together is shown for clarity. Two of the three signals 100, 110, and 120 received by receiver 12 represent signals generated by the transmitters of the associated sites. Signals 130 from a constellation of GPS satellites impinge on the GPS antenna 1, and are passed to GPS receiver 2. GPS receiver 2 is designed specifically to extract time information from the GPS signals, in contrast with the far more common positional information of conventional GPS receivers.

GPS receiver 2 generates a very stable 10 MHz clock signal that passes into a phased-locked oscillator (PLO) 3 which acts as a low-pass filter, increasing the time positional accuracy of the clock signal by orders of magnitude. GPS receiver also generates a very stable one-pulse-per-second data stream that is fed to the radar state machine 5. The 10 MHz signal fed to the phase-locked oscillator 3, is converted to a 120 MHz timing signal that is used for generation of the radar carrier and other internal frequencies. This 120 MHz reference signal is passed to the clock generator 4. It divides the reference signal down to generate a number of other reference frequencies needed by other devices including a 12 MHz signal fed to microprocessor 7; a 40 MHz signal fed to the radar state machine 5; and a 60 or 120 MHz signal that is passed to a direct signal synthesizer (DSS) and its oscillators 6.

The radar state machine 5 instructs the radar what to do versus time. For example, it generates signals that turn on and off the transmitter output and receiver input signals, so that they are not on at the same time. It also turns on and off switches or gates that suppress transmit or receive signals at various points in the system when they are not wanted. Radar state machine 5 also determines the start and end of the linear frequency sweep modulation. Different sweep start times in different radars that are synchronized via the common GPS timing separate the local sea-echo information from each so that they do not interfere with each other.

Microprocessor 7 (supported by memory chip 8) is the interface to computing device 10 that allows a human operator to control the radar, and processes the received echo signals in real time. Microprocessor 7 also communicates with GPS receiver 2, and transmit/receive (T/R) switch 9. The latter turns on and off various channels in radar transmitter 11 and receiver 12 that suppress their signals at the appropriate times during the pulsing cycle.

The radio-frequency (RF) signals transmitted by transmitter 11 are generated in DSS block 6. These signals contain the sweep and pulse modulations. The sweep span in frequency, sweep repetition interval, pulse and blank periods, and the carrier frequency are all digitally represented and generated, ensuring that each periodic repetition of the waveform is substantially identical to previous cycles. This has the effect of shifting spurs and other waveform imperfections to DC (the zero-Doppler spectral position), so as not to interfere with the Doppler-shifted sea echo information. Carrier frequencies between 0 and 75 MHz are generated by the system via DDS block 6 the output signals of which are provided to transmitter 11, and radiated through transmit antenna 13. Replicas of these signals, along with their quadrature versions, are mixed in the receiver 12, with the incoming echo, noise, and other radar signals that enter its antenna system 14.

The linear frequency modulation sweep start times of multiple radar transmitters operating on the same carrier frequency are synchronized using the same GPS common timing signal, starting at precisely designated but slightly different times. The start times depend on the radar site geometries with respect to each other.

In the absence of ITU-recommended guidance for conformity, we have developed procedures that are described herein. Simply broadcasting a call sign is not enough to ensure that it meets the intended spirit of the law. Therefore, according to some implementations enabled by the present disclosure, the broadcast call sign is capable of being heard and decoded by any radio receiver that is hearing the radar signal. Because their bandwidths differ greatly (radio bandwidths are much narrower than those for radar), this is one reason why a radio may hear the radar signal but not the call sign, if it has too narrow a bandwidth. To address this, it is desirable that the audio intensity of the call sign heard within an AM-demodulated radio receiver is comparable to the level of the interfering radar signal. At least some implementations enabled by the present disclosure follow this intended spirit fairly.

Some implementations enabled by the present disclosure also ensure continuous radar data capture during call-sign broadcast periods, both by the radar itself as well as by neighboring radars on the same frequency, with little or no deleterious effects on the output information. We demonstrate this with radar Doppler spectra spanning periods of call-sign transmission.

A particular class of implementations relate to a multi-site or multi-static coastal radar system for monitoring water surface targets. The radar system includes a first radar, a second radar, or more; a state machine; and a signal processor. The first and second radars each include a transmitter and a receiver, and are located in separate locations and are synchronized using timing signals. Each radar is configured to transmit radar signals and receive echoes of radar signals from the other radar or stand-alone transmitters. The state machine is configured to determine, using the timing signals, start times and end times of radio frequency signal modulations for each radar, the start time of the radio frequency signal modulation of the second radar being offset from the start time of the radio frequency signal modulation of the first radar. The signal processor is configured to substantially simultaneously receive and process the echoes of the radar signals received at the first and second radars to determine position and velocity vectors for the monitored water surface targets, wherein a first set of position and velocity vectors is determined from echoes, received at the first radar, of the radar signals transmitted by the second radar, and wherein a second set of position and velocity vectors is determined from echoes, received at the second radar, of radar signals transmitted by the first radar.

As described above, HF/VHF/UHF radars are now required under U.N. ITU Resolution 612 to broadcast a Morse-coded call sign for station identification, at least once every 20 minutes. During the period of the call-sign broadcast, each radar interrupts transmission of the normal radar signal. According to various implementations enabled by the present disclosure, other radars on the same frequency continue to operate, uninterrupted, during the call-sign broadcast of another, with little or no degradation of echo information being received. Specific implementations include two other features for the intended call-sign purpose: (i) the call sign is heard across the same spectral span as the radar signal, even though impacted receivers may have much smaller bandwidths from the radar's signal; (ii) the call sign is heard at the same intensity as the radar signal in a typical radio receiver. These features attempt to ensure fairness in the intended purpose, and to avoid legal complaints that the radar is not properly identified because the call sign is not heard while the radar signal is heard.

Some implementation follow ITU guidelines that Morse-coded call signs should be broadcast at about 15 words per minute. Understanding that assigned call signs will normally have six alpha-numeric characters, the typical length of an unrepeated broadcast will vary between five and 10 seconds, because the length of a character is related to the Morse dot-dash sequence assigned to each character. For example the character "e" is a single dot (the shortest possible duration); an "o" is three dashes (a long duration).

Some implementations involve sweeping at a much higher rate. With the FMCW sweep bandwidth selected for the range resolution desired—and conforming to that allowed by the national licensing authority (e.g., the FCC in the U.S.)—the sweep repetition rate during the call sign is changed from the 1-2 Hz used for radar operation, to an audio value, e.g., 640 Hz. It is turned on and off with dot-dash patterns according to the six-character assigned call sign. During the "on" periods, the tone is heard at the audio frequency that would be heard in a simple radio receiver with standard AM (or other) demodulation. For example, 640 Hz is near E of the fifth octave of the music scale. Details to accomplish this are provided below. The output amplitude during the "on" periods is digitally adjusted to correspond to the audio strength heard in a standard AM radio tuned to any frequency within the radar signal bandwidth.

According to some implementations, a graphical user interface (GUI) allows the user to enter the call sign and the timing of its broadcasts. These are typically set to avoid call-sign broadcast times of other radars on the same frequency that are within hearing range of the radar. The GUI also lets the user enter how many times sequentially the call sign is to be broadcast—usually one or two. After the call-sign broadcast period, the radar receiver is turned back on and the normal radar-signal mode commences again.

According to some implementations, the call-sign function engages the radar's transmit section only, although all basic signal-generation is initiated in the receiver's DDS (direct-digital synthesis) module, or equivalent. The receiver continues to operate during this several-second period, but its digital output is effectively interpolated across the period while it is off, meaning actual echo and noise data from each side of the gap are used to construct the interpolating signal.

Implementations for use with FMCW radars differ from radio applications. At and near HF, the latter operate typically within an assigned 3-10 kHz bandwidth, determined usually by the requirement to transmit audio information. Oceanographic radars must operate over bandwidths typically from 25 kHz to 1 MHz, in order to realize useful target range resolution. The call sign should be tailored to match or overlap the bandwidths of radio receivers, which are the most common users of the MF through UHF bands.

A. Call-Sign Setup Menu/Input

Figure 2:
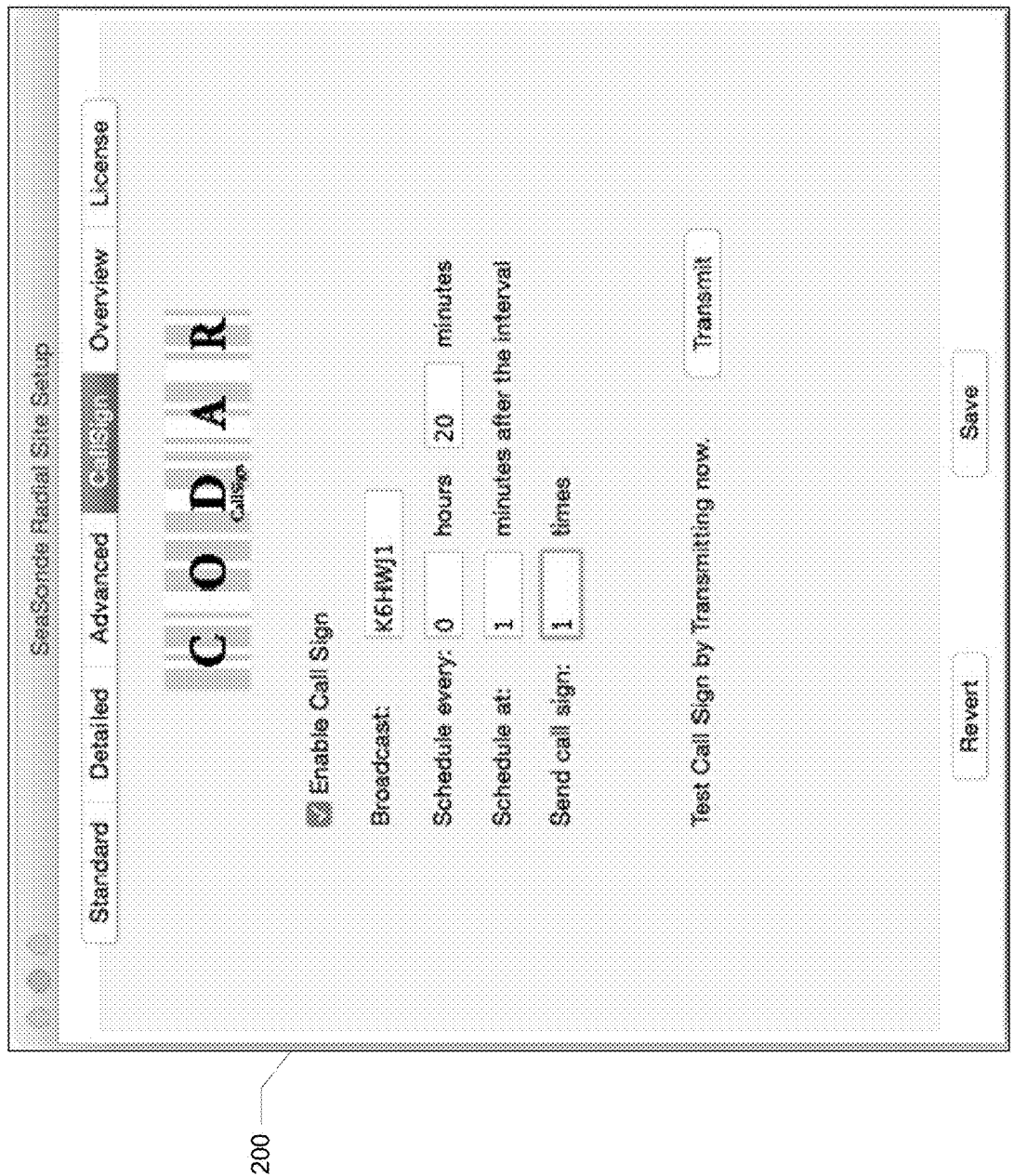
FIG. 2 is a graphical user interface (GUI) representing one implementation of a method for entering call-sign information and broadcast scheduling.
Figure 3:
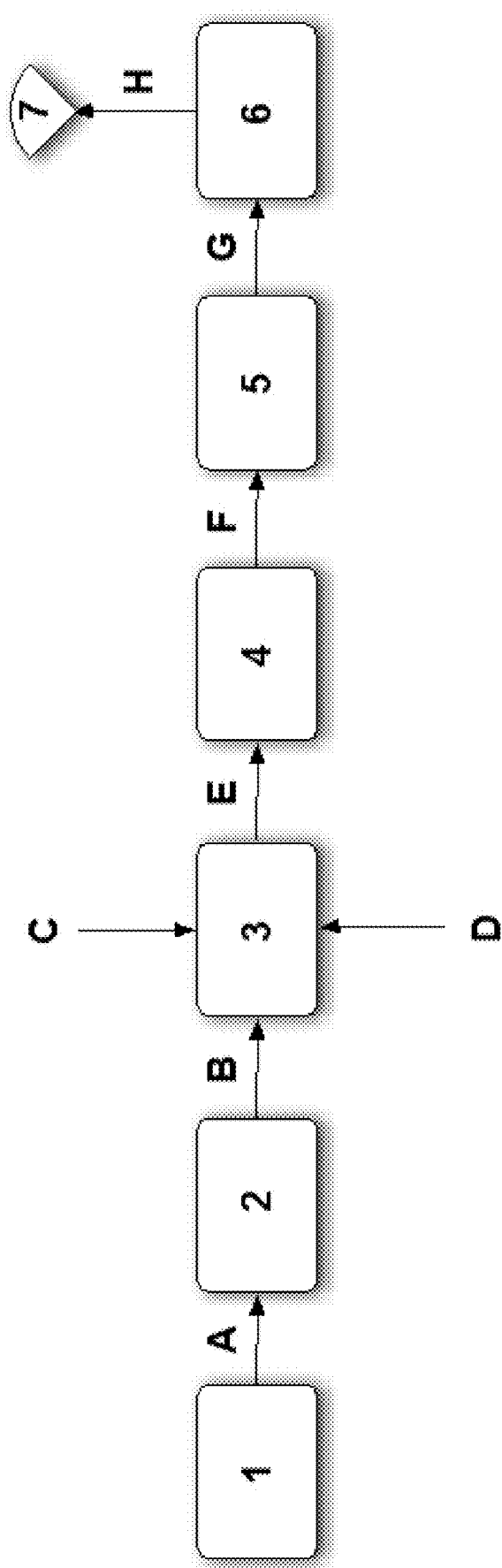
FIG. 3 is an exemplary diagram of a methodology to create and broadcast a call sign.

FIGS. 2 and 3 illustrate the algorithmic flow of a particular implementation of an oceanographic radar system configured for call-sign transmission. As will be appreciated, the computer program instructions representing this algorithmic flow may be stored on and used to control operation of a computing device, e.g., device 10 of FIG. 1 or another related computing device. It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. Suitable alternatives known to those of skill in the art may be employed.

A software-inputted setup would typically be required to initiate the call-sign protocol for a radar. In one non-exclusive implementation, a graphical user interface (GUI) is provided for this purpose, an example of which is shown in FIG. 2. The call sign inserted in the window to be broadcast can be any length, comprised of alpha-numeric characters. In the U.S. and most other countries, the length is presently six characters. The settings in GUI 200 show that the call sign is to be broadcast every 20 minutes (i.e., the maximum ITU required interval), starting at 1 minute after the hour. By clicking the "Transmit" button, the call-sign procedure begins immediately and continues indefinitely, until "Transmit" is clicked off. There is an option to transmit the six-character call sign only once at each scheduled time, or send it multiple times (e.g., two or three times consecutively).

The setup via GUI 200 is typically done once, at the beginning of a call-sign installation on the radar, which would then remain available while the radar is operating. This example has the call sign for that radar to be broadcast every 20 minutes, starting one minute after the beginning of the hour. There is an option to repeat the call sign immediately after broadcast (for better chance of capture); this example shows the call sign being broadcast only a single time. The broadcast length of the call sign in seconds is calculated and displayed (5.8 s in this case where the call sign is K6HWJ1).

After this GUI table is set up, click on the "Save" button to store it. When it is desired to begin call-sign radiation, click on the button "Transmit". This will begin the cycle of its continual transmission every 20 minutes. It is preferable that other radars operating on the same frequency that can hear each other's signals are staggered in their broadcasts (e.g., a minute or more apart); otherwise, call signs from two radars could be heard simultaneously, potentially rendering each unintelligible. To terminate call-sign transmission, under the "Transmit" button, enter "Terminate" under the options choice presented.

Again, the GUI setup of call sign here is meant to reveal one implementation, and does not rule out other schemes obvious to those skilled in the art.

B. Information/Signal Flow During Call-Sign Radiation

Refer to FIG. 3 for one implementation of the functional operation during call-sign radiation of an FMCW radar. The numerical labels in the boxes denote a software function performed. The letter labels denote the information being transferred. Again, the depicted implementation is merely one example of the range of implementations enabled by the present disclosure. We understand that other implementations are possible and included within the scope of this disclosure, that are obvious to those skilled in the art.

Block 1 creates the digital representation of the call sign in Morse code, as per the GUI described with reference to FIG. 2. This includes Morse-encoding that creates the call-sign timing pattern. The storage if the resulting call-sign message (Label A) is represented by Block 2. In order to achieve the ITU-recommended 15 words per minute, and based on an average call sign length for a single repetition of about six seconds, the following is an example of timing that will meet this objective:

Time duration of each dot is 62.5 ms (milli-second);
Time duration of each dash is 187.5 ms (3×62.5 ms);
Time duration of dead space between dots and dashes is 62.5 ms;
Time duration of dead space between characters is 187.5 ms;
Time duration of dead space between words (e.g., repetition of call sign) is 437.5 ms.

This formatted information will be used to create pulses for the call sign. It is passed along (Label B) to the state machine (Block 3) and retained there till it is needed for transmission. The state machine controls switching between the radar-signal transmit mode and the call-sign transmit mode. Also sent with the call-sign code format is the timing specified in the GUI of FIG. 2.

In addition, the formatted information used and stored in the conventional radar encoding (direct digital synthesis) of the pulsed FMCW signal format (Label C) is sent to the state machine (Block 3) and retained there also as needed for generation and transmission of the radar signal.

Timing signals (Label D) from a common GPS-stabilized clock are also sent to the state machine (Block 3). Based on the requested time starts for the call sign specified in the GUI of FIG. 2, at the appointed time for call-sign transmission, the state machine of Block 3 executes the following sequence of functions:

At the end of the next normal FMCW signal linear sweeps (e.g., every 0.5 s or 1 s), the transmitter is turned off from its normal radar signal radiation.

The receiver is blanked, meaning signals from the receive antennas are shut off; the receiver then responds only to internal noise. The A/D (analog-to-digital) converter at the receiver output continues its normal mode of sending outputted noise to the computer for processing.

The SRF (sweep repetition frequency) is changed from its normal 1 or 2 Hz rate to 640 Hz (or any other desired audio rate). The sweep bandwidth, however, is kept the same during radar and call-sign operations, e.g., 50 kHz. This ensures the call sign and radar signal are broadcast and heard over the same spectral bandwidths.

Begin broadcasting the call-sign dot-dash-blank pattern as specified by the digital sequential time and frequency instructions for the combined radar signal and call-sign signal (Label E) as stored in the state machine (Block 3). According to a particular implementation, during the dot or dash, the 640 Hz FMCW sweep will be broadcast, and during the blank gaps in between, no signal will be broadcast. This allows the call sign to be heard in AM (including upper and lower sideband) radio receivers as the Morse on/off code pattern on top of the 640 Hz audio tone.

FMCW signal generation based on the overlay of pulsing/gating modulation is represented by Block 4. The resulting signal, i.e., the actual digital pattern of the combined radar pulsed/gated FMCW and call-sign signals (Label F), is converted to an analog signal by digital-to-analog converter (Block 5), thereby generating an analog low-power-level RF signal of the combined radar signal and call sign to be transmitted (Label G).

The low-power RF signal is then provided to the transmit amplifier (Block 6), and the resulting full-power RF signal (Label H) is transmitted by the radar's transmit antenna (Block 7).

At the end of the call-sign broadcast (including any repeats), radar waveform transmission is resumed. The digital processing of radar signal and call-sign interval continues uninterrupted, except for a special digital interpolation for the gap period of the call sign; this will be described in the next section.

The methodology for this implementation—and exemplified in FIG. 3—also ensures that the call sign will be heard at substantially the same intensity as the radar signal in a narrow-band AM radio receiver. Both the call sign and standard FMCW radar signal formats have substantially the same levels, as well as sweep bandwidths in kHz.

C. Ensuring Continuous Radar Data Processing

It has been noted that most applications for real-time coastal oceanographic radars demand continuous data streams with no gaps. These societally important applications include tsunami detection and warning, Coast Guard search and rescue, oil-spill mitigation operations, etc. Halting transmission and reception while one or more stations transmits a call sign instead of the normal radar signal is precisely the kind of gap to be avoided.

Figure 4A:
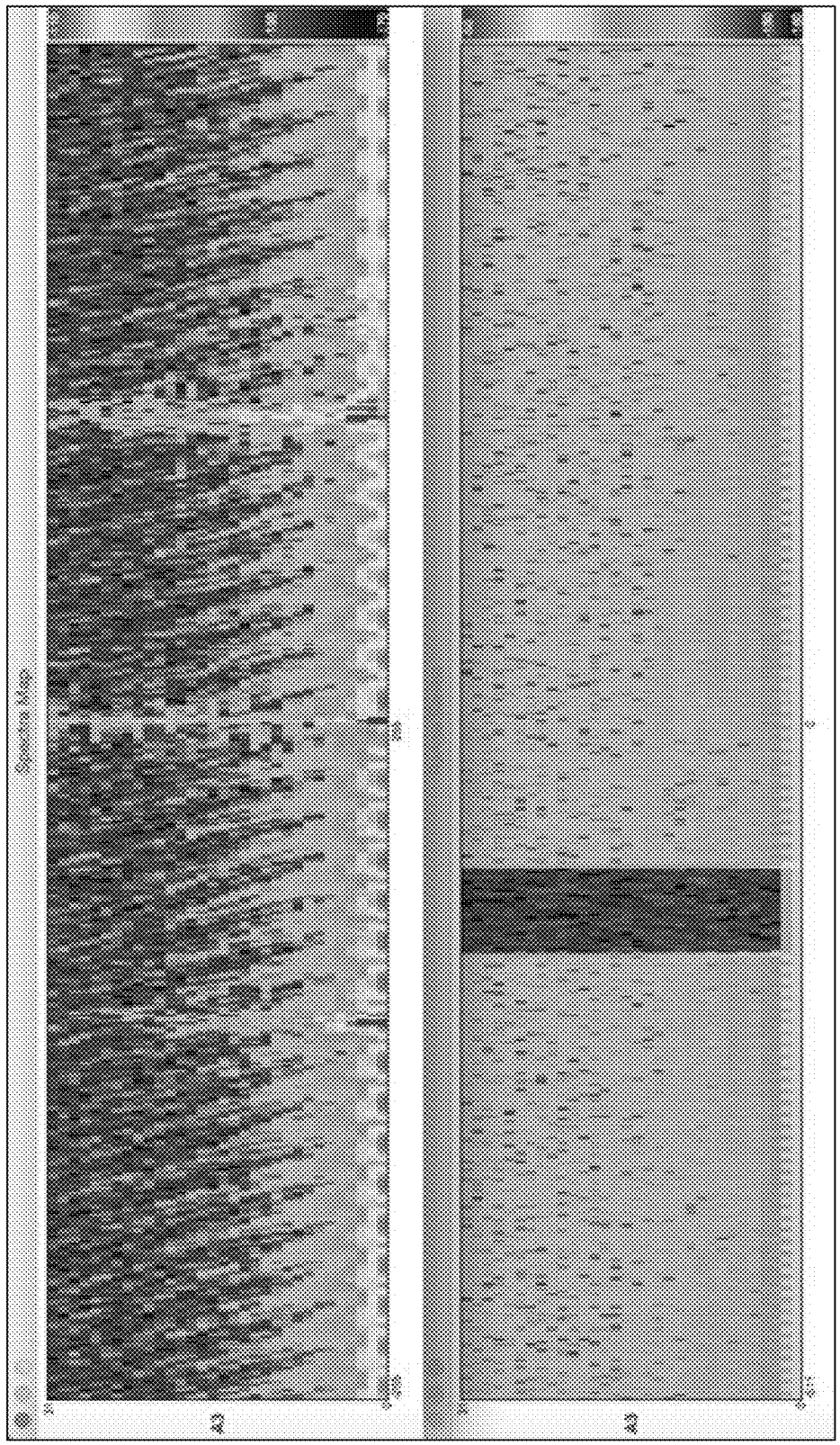
FIGS. 4a and 4b illustrate an example of signal outputs, including normal radar signal broadcast and including the time gap during which the call sign is broadcast.

The bottom strip of FIG. 4a is the received 13-MHz sea-echo time series vs. range to target (vertical axis) as a function of time (horizontal axis) over 256 seconds. The vertically blocked out piece is the gap during which the call sign is transmitted and the receiver is blanked (shut off), meaning a near-zero signal has interrupted the normal echo data. The top strip of FIG. 4a is the Doppler spectrum of the lower strip, which is the conventional method of obtaining current, tsunami, and wave data from the strong Bragg echoes. However, the brief interruption shown in the lower strip necessary to transmit the call sign produces unacceptable masking of the desired signals, as seen by the streaks slanted toward the left in the top strip of FIG. 4a.

That is, the top strip of FIG. 4a demonstrates the problem of a call-sign gap. This is a Doppler spectrum that contains the needed information, namely Bragg echoes from the sea surface. Even a gap of 10-20 seconds (as shown in the bottom strip of FIG. 4a) produces smeared, sloping stripes across range and Doppler frequency (top strip). The call-sign gap represents shutting off the received sea echo during the call-sign transmission when no radar signal is being radiated. This near-zero abrupt change in sea echo produces these masking, interfering stripes in the Doppler spectrum, even though it is based on a sea-echo time series much longer (256 seconds) than the length of the gap itself (10-20 seconds).

Figure 4B:
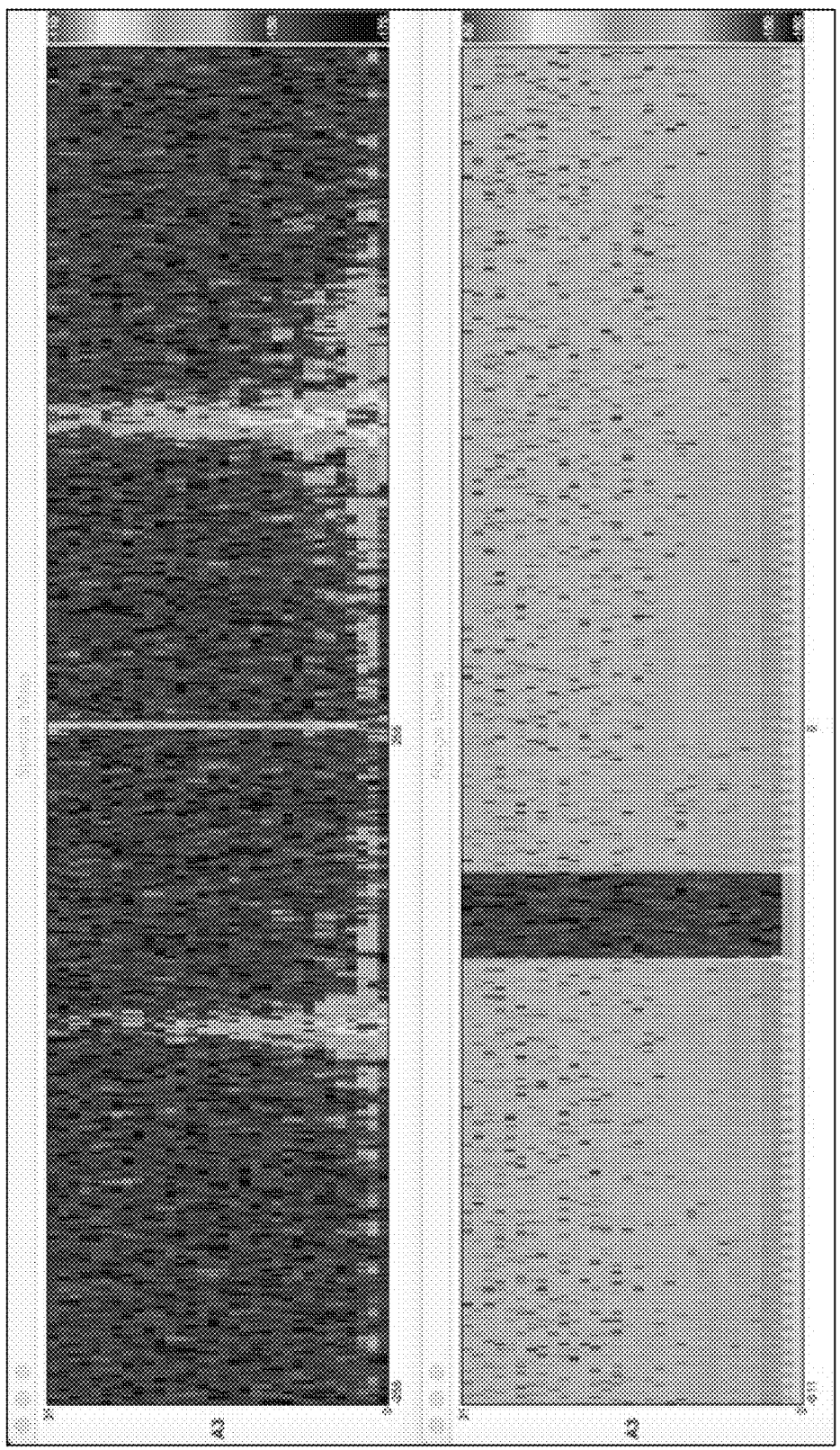

The bottom strip of FIG. 4b is the received 13-MHz sea-echo time series vs. range to target (vertical axis) as a function of time (horizontal axis) over 256 seconds. This is substantially the same as the bottom strip of FIG. 4a. However, in this example, the vertical strip during call-sign transmission will be filled in (interpolated) by interpolating data from the remainder for that target range, rather than being set to near zero. The top strip of FIG. 4b is the Doppler spectrum of the lower strip after interpolation across the call-sign gap. Now the spectrum reveals all of the essential echo information. Namely, the two Bragg peaks symmetrically positioned about the center that contain the ocean current and tsunami information. There is no perceptible distortion of these from what would be observed if the call-sign gap had not occurred.

That is, an effectively uncontaminated Doppler spectrum of sea echo is shown as the top strip in FIG. 4b. The Bragg peaks symmetrically arrayed about the center position are clearly seen, and these will produce valid current, tsunami, etc. data that are desired. Ship echoes and higher-order sea echo farther away from the Bragg peaks—when present—will have likewise been unmasked from the contaminating stripes. This top strip in FIG. 4b was obtained by using the method revealed here (which is one possible implementation) to fill in the call-sign gap.

The method revealed here to solve the challenge is explained by recognizing that an abrupt gap in the received signal (plus noise)—when Fourier-transformed to obtain the Doppler spectrum—produces side lobes that are not sufficiently low. But if one interpolates across the gap, eliminating the abrupt time-series gap-edge jumps, relief should be obtained from the masking stripes. The method we have found effective and robust is one possible implementation of interpolation. It averages the complex signal over the remaining region outside the gap, and fills with that average. The gap start and end times are known, as they are the programmed beginning and ends of the call sign when the receiver is turned off. Thus, interpolation may be used to solve the contamination problem created by the call-sign transmission gap in that radar. We point out that other interpolation techniques known to those skilled in the art may be employed to accomplish the same objective.

Because all radars must broadcast their own call signs (at differing times to avoid miss-identification by a receiver listening on the common frequency), the question to ask is: do nearby companion radars in the network that can hear the first radar's signal also need to have their receivers shut off? If so, that would present an impediment to the utility of the network for emergency applications where continuous data are required. The answer is no. Using the call-sign modulation scheme we have described earlier, we have verified that adjacent radars can continue to process their received signals while a call sign is being broadcast by a neighbor. The call sign is sufficiently weak that it falls below the noise level of adjacent radars. This is similar to the spread-spectrum concept, where mutual interference is avoided by keeping signals sufficiently low in power and spectrally spread so that each other's signals are non-interfering.

Although certain of the components and processes are described above in the singular for convenience, it will be appreciated by those of skill in the art that multiple components and repeated processes can also be used to practice the techniques described herein.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A coastal radar system, comprising a network of frequency-modulated continuous wave (FMCW) radar systems, each FMCW radar system including a radio frequency (RF) transmitter and computing resources configured to control operation of the RF transmitter, the computing resources for each of the FMCW radar systems being configured to control the RF transmitter to periodically transmit first RF energy in a radar data capture mode and to periodically transmit second RF energy in a call sign mode, the second RF energy being modulated using Morse code to represent a call sign for the corresponding FMCW radar system, wherein the call sign modes for the respective FMCW radar systems occur at different times, and wherein the computing resources for each of the FMCW radar systems are configured to control a power level of the second RF energy such that the call sign mode of the FMCW radar system does not interfere with simultaneously conducted radar data capture modes of others of the FMCW radar systems.

2. The coastal radar system of claim 1, wherein, for each of the FMCW radar systems, the first RF energy occupies a first frequency band and the second RF energy occupies a second frequency band, the first frequency band being substantially the same as the second frequency band.

3. The coastal radar system of claim 2, wherein, for each of the FMCW radar systems, the first RF energy and the second RF energy are characterized by substantially the same intensity.

4. The coastal radar system of claim 1, wherein each of the FMCW radar systems includes an RF receiver, and wherein the computing resources for each of the FMCW radar systems are configured to disable the RF receiver while the RF transmitter is in the call sign mode, and to interpolate radar data received by the RF receiver during successive periods of the radar data capture mode to mitigate digital processing artifacts associated with the RF receiver being disabled during the call sign mode.

5. The coastal radar system of claim 4, wherein, for each of the FMCW radar systems, the radar data capture mode is characterized by a time-series Doppler-processing input cycle, wherein the call sign mode occupies a gap in the time-series Doppler-processing input cycle, and wherein, for each of the FMCW radar systems, the computing resources are configured to interpolate the radar data received by the RF receiver during the successive periods of the radar data capture mode by averaging the radar data over a remainder of the time-series Doppler-processing input cycle.

6. The coastal radar system of claim 5, wherein, for each of the FMCW radar systems, the time-series Doppler processing cycle includes a plurality of radar sweep periods, and wherein the gap corresponding to the call sign mode begins at an end of one of the radar sweep periods.

7. A frequency-modulated continuous wave (FMCW) radar system, comprising a radio frequency (RF) transmitter and computing resources configured to control operation of the RF transmitter, the computing resources being configured to control the RF transmitter to periodically transmit first RF energy in a radar data capture mode, and to periodically transmit second RF energy in a call sign mode, the computing resources also being configured to disable the radar data capture mode during the call sign mode, wherein the first RF energy is characterized by a first sweep repetition frequency and a first sweep bandwidth, and the second RF energy is characterized by a second sweep repetition frequency and a second sweep bandwidth, wherein the first sweep repetition frequency is different than the second sweep repetition frequency, and wherein the first sweep bandwidth is substantially the same as the second sweep bandwidth, and wherein the second RF energy is modulated using Morse code to represent a call sign for the FMCW radar system.

8. The FMCW radar system of claim 7, wherein the first RF energy and the second RF energy are characterized by substantially the same intensity.

9. The FMCW radar system of claim 7, further comprising an RF receiver, wherein the computing resources are configured to disable the RF receiver while the RF transmitter is in the call sign mode, and to interpolate radar data received by the RF receiver during successive periods of the radar data capture mode to mitigate digital processing artifacts associated with the RF receiver being disabled during the call sign mode.

10. The FMCW radar system of claim 9, wherein the radar data capture mode is characterized by a time-series Doppler-processing input cycle, wherein the call sign mode occupies a gap in the time-series Doppler-processing input cycle, and wherein the computing resources are configured to interpolate the radar data received by the RF receiver during the successive periods of the radar data capture mode by averaging the radar data over a remainder of the time-series Doppler-processing input cycle.

11. The FMCW radar system of claim 10, wherein the time-series Doppler processing cycle includes a plurality of radar sweep periods, and wherein the gap corresponding to the call sign mode begins at an end of one of the radar sweep periods.

12. A frequency-modulated continuous wave (FMCW) radar system, comprising a radio frequency (RF) transmitter, an RF receiver, and computing resources configured to control operation of the RF transmitter and the RF receiver, the computing resources being configured to control the RF transmitter to periodically transmit first RF energy in a radar data capture mode and to periodically transmit second RF energy in a call sign mode, the second RF energy being modulated using Morse code to represent a call sign for the FMCW radar system, the computing resources also being configured to disable the RF receiver while the RF transmitter is in the call sign mode, and to interpolate radar data received by the RF receiver during successive periods of the radar data capture mode to mitigate digital processing artifacts due to the RF receiver being disabled during the call sign mode.

13. The FMCW radar system of claim 12, wherein the radar data capture mode is characterized by a time-series Doppler-processing input cycle, wherein the call sign mode occupies a gap in the time-series Doppler-processing input cycle, and wherein the computing resources are configured to interpolate the radar data received by the RF receiver during the successive periods of the radar data capture mode by averaging the radar data over a remainder of the time-series Doppler-processing input cycle.

14. The FMCW radar system of claim 13, wherein the time-series Doppler processing cycle includes a plurality of radar sweep periods, and wherein the gap corresponding to the call sign mode begins at an end of one of the radar sweep periods.

15. A coastal radar system, comprising a network of frequency-modulated continuous wave (FMCW) radar systems, each FMCW radar system including a radio frequency (RF) transmitter and computing resources configured to control operation of the RF transmitter, the computing resources for each of the FMCW radar systems being configured to control the RF transmitter to periodically transmit first RF energy in a radar data capture mode and to periodically transmit second RF energy in a call sign mode, wherein the first RF energy is characterized by a first sweep repetition frequency and a first sweep bandwidth, and the second RF energy is characterized by a second sweep repetition frequency and a second sweep bandwidth, wherein the first sweep repetition frequency is different than the second sweep repetition frequency, and wherein the first sweep bandwidth is substantially the same as the second sweep bandwidth, wherein the second RF energy is modulated using Morse code to represent a call sign for the corresponding FMCW radar system, wherein, for each of the FMCW radar systems, the first RF energy and the second RF energy are characterized by substantially the same intensity, and wherein the call sign modes for the respective FMCW radar systems occur at different times, and wherein the computing resources for each of the FMCW radar systems are configured to control a power level of the second RF energy such that the call sign mode of the FMCW radar system does not interfere with the radar data capture modes of others of the FMCW radar systems.

16. The coastal radar system of claim 15, wherein each of the FMCW radar systems includes an RF receiver, and wherein the computing resources for each of the FMCW radar systems are configured to disable the RF receiver while the RF transmitter is in the call sign mode, and to interpolate radar data received by the RF receiver during successive periods of the radar data capture mode to mitigate digital processing artifacts associated with the RF receiver being disabled during the call sign mode.

17. The coastal radar system of claim 16, wherein, for each of the FMCW radar systems, the radar data capture mode is characterized by a time-series Doppler-processing input cycle, wherein the call sign mode occupies a gap in the time-series Doppler-processing input cycle, and wherein, for each of the FMCW radar systems, the computing resources are configured to interpolate the radar data received by the RF receiver during the successive periods of the radar data capture mode by averaging the radar data over a remainder of the time-series Doppler-processing input cycle.

18. The coastal radar system of claim 17, wherein, for each of the FMCW radar systems, the time-series Doppler processing cycle includes a plurality of radar sweep periods, and wherein the gap corresponding to the call sign mode begins at an end of one of the radar sweep periods.

19. A coastal radar system, comprising a network of frequency-modulated continuous wave (FMCW) radar systems, each FMCW radar system including a radio frequency (RF) transmitter and computing resources configured to control operation of the RF transmitter, the computing resources for each of the FMCW radar systems being configured to control the RF transmitter to periodically transmit first RF energy in a radar data capture mode and to periodically transmit second RF energy in a call sign mode, wherein the first RF energy is characterized by a first sweep repetition frequency and a first sweep bandwidth, and the second RF energy is characterized by a second sweep repetition frequency and a second sweep bandwidth, wherein the first sweep repetition frequency is different than the second sweep repetition frequency, and wherein the first sweep bandwidth is substantially the same as the second sweep bandwidth, wherein the second RF energy is modulated using Morse code to represent a call sign for the corresponding FMCW radar system, and wherein the computing resources for each of the FMCW radar systems are configured to control a power level of the second RF energy such that the call sign modes for the respective FMCW radar systems do not interfere with the radar data capture modes of others of the FMCW radar systems.

20. The coastal radar system of claim 19, wherein the call sign modes for the respective FMCW radar systems occur at different times.

21. The coastal radar system of claim 19, wherein during the call sign mode of each of the FMCW radar systems, the others of the FMCW radar systems continue to operate in their respective radar data capture modes with little or no degradation of radar data received.

22. The coastal radar system of claim 19, wherein each of the FMCW radar systems includes an RF receiver, and wherein the computing resources for each of the FMCW radar systems are configured to disable the RF receiver while the RF transmitter is in the call sign mode, and to interpolate radar data received by the RF receiver during successive periods of the radar data capture mode to mitigate digital processing artifacts associated with the RF receiver being disabled during the call sign mode.

23. The coastal radar system of claim 22, wherein, for each of the FMCW radar systems, the radar data capture mode is characterized by a time-series Doppler-processing input cycle, wherein the call sign mode occupies a gap in the time-series Doppler-processing input cycle, and wherein, for each of the FMCW radar systems, the computing resources are configured to interpolate the radar data received by the RF receiver during the successive periods of the radar data capture mode by averaging the radar data over a remainder of the time-series Doppler-processing input cycle.

24. The coastal radar system of claim 23, wherein, for each of the FMCW radar systems, the time-series Doppler processing cycle includes a plurality of radar sweep periods, and wherein the gap corresponding to the call sign mode begins at an end of one of the radar sweep periods.

25. The coastal radar system of claim 19, wherein, for each of the FMCW radar systems, the first RF energy occupies a first frequency band and the second RF energy occupies a second frequency band, the first frequency band being substantially the same as the second frequency band.

26. The coastal radar system of claim 19, wherein, for each of the FMCW radar systems, the first RF energy and the second RF energy are characterized by substantially the same intensity.

27. The coastal radar system of claim 19, wherein, for each of the FMCW radar systems, the first RF energy occupies a first frequency band and the second RF energy occupies a second frequency band, the first frequency band being substantially the same as the second frequency band, wherein, for each of the FMCW radar systems, the first RF energy and the second RF energy are characterized by substantially the same intensity.

28. The coastal radar system of claim 19, wherein, for each of the FMCW radar systems, the call sign mode occupies a gap in a time-series Doppler-processing input cycle, the time-series Doppler processing cycle including a plurality of radar sweep periods, and wherein the gap corresponding to the call sign mode begins at an end of one of the radar sweep periods.

* * * * *